United States Patent Office 3,434,984
Patented Mar. 25, 1969

3,434,984
THERMOSETTING CATIONIC RESIN AND
METHOD OF MAKING SAME
James W. Hyland, Jr., Maumee, Ohio, assignor to Owens-Illinois, Inc., a corporation of Ohio
No Drawing. Continuation-in-part of application Ser. No. 298,464, July 29, 1963. This application Apr. 25, 1966, Ser. No. 544,717
Int. Cl. C08g 20/26
U.S. Cl. 260—18                 5 Claims

ABSTRACT OF THE DISCLOSURE

Thermosetting cationic resins which impart wet strength and water holdout properties to cellulosic materials are prepared by reacting epichlorohydrin and a polyamide, the polyamide being the reaction product of a polyalkylene polyamide, a polymeric fat acid, and a saturated aliphatic dibasic carboxylic acid.

---

The present invention is a continuation-in-part of my copending application Ser. No. 298,464, filed July 29, 1963, now U.S. Patent No. 3,248,280.

The present invention relates to thermosetting cationic resins which have good water holdout and wet strength properties when applied to cellulosic materials and to methods of making these resins.

It is known that uncured thermosetting cationic resins comprising a water-soluble polymeric reaction product of epichlorohydrin and a polyamide derived from a polyalkylene polyamine and a saturated aliphatic dibasic carboxylic acid containing 3 to 10 carbon atoms can be applied to fibrous cellulosic materials such as paper pulp so as to impart wet strength thereto (see U.S. Patent No. 2,926,154). Moreover, it is also known that the sizing or water proofing properties of paper can be greatly improved by employing beater additives in the manufacture of paper consisting of certain polyamide resin suspensoids which are prepared as a dispersion in an acidic aqueous medium of a polyamide derived from polymeric fat acids and polyamines having at least 3 atoms intervening between the amine groups principally involved in the amidification reaction, the polyamide having an amine number of at least 5.

It has now been discovered that a polyamide-epichlorohydrin resin made with the polyamide derived from a polyamine and a mixture of (a) certain dicarboxylic acids and (b) polymeric fat acids produces an unexpected and unpredictable synergism. Thus, the resulting resin is characterized by having superior sizing and water holdout properties than the polyamide resin suspensoids referred to above.

It is therefore an object of this invention to provide novel products which have incorporated therein polyamide-epichlorohydrin resins and which are characterized by having improved sizing properties in the case of cellulosic materials such as paper and cotton fabrics and improved water holdout properties in the case of wool fabrics.

It is another object of this invention to provide novel paper products which have incorporated therein polyamide-epichlorohydrin resins and which are characterized by having improved wet strength and sizing properties.

Additionally, it is an object of the present invention to provide an efficient and economical process for forming such resins.

Yet another object of the present invention is to provide an efficient and economical method of forming a polyamide capable of further reacting with epichlorohydrin to form a thermosetting cationic resin possessing the desired water holdout and wet strength properties with respect to cellulosic materials.

It is another object of the present invention to provide a novel process of producing such cellulosic and wool products.

A still further object of this invention is to provide a more economical process for making paper products characterized by having excellent wet strength and water proofing or sizing properties.

These and other objects will be apparent from the description which follows.

In accordance with the invention, the above and other objects are accomplished by applying to wool and cellulosic materials, such as paper pulp, an uncured thermosetting cationic resin comprising a water-soluble polymeric reaction product of epichlorohydrin and a polyamide derived from a polyalkylene polyamine and a mixture of (a) a saturated aliphatic dibasic carboxylic acid containing from about 3 to about 10 carbon atoms and (b) a polymeric fat acid. It has been found that resins of this type impart excellent wet strength and sizing or waterproofing properties to a cellulosic materials such as paper, and improved water holdout properties to wool fabrics.

Additionally, it has been found that the polyamide-epichlorohydrin resins of the present invention are effective when the molar ratio of polymeric fat acid to saturated aliphatic dibasic carboxylic acid is in the range of about 1:0.5 to about 1:8. Usually, the molar ratio of polymeric fat acid to saturated aliphatic dibasic carboxylic acid is in the range of about 1:1 to about 1:6.5.

The dicarboxylic acids contemplated for use in preparing the resins of the invention are the saturated, aliphatic, dibasic, carboxylic acids containing from 3 to 10 carbon atoms such as succinic, adipic, azelaic, and the like with saturated dibasic acids having from 4 to 8 carbon atoms in the molecule being preferred. Blends of two or more of the saturated dibasic carboxylic acids may also be used.

A variety of polyalkylene polyamines may be employed, of which the polyethylene polyamines represent an economically preferred class. More specifically, the polyalkylene polyamines contemplated for use may be represented as polyamines in which the nitrogen atoms are linked together by groups of the formula —$C_nH_{2n}$— where $n$ is a small integer greater than unity and the number of such groups in the molecule ranges from two up to about eight. The nitrogen atoms may be attached to adjacent carbon atoms in the group —$C_nH_{2n}$— or to carbon atoms further apart, but not to the same carbon atoms. This invention contemplates not only the use of such polyamines as diethylenetriamine, triethylenetetramine, tetraethylenepentamine and dipropylenetriamine, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine is a very satisfactory starting material. The term "polyalkylene polyamine" employed in the claims, therefore, refers to and includes any of the polyalkylene polyamines referred to above or to a mixture of such polyalkylene polyamines.

The polymeric fat acids employed can be those resulting from the polymerization of drying or semidrying oils, or the free acids or simple aliphatic alcohol esters thereof. Suitable drying or semidrying oils include soybean, linseen, tung, perilla, oiticica, cottonseed, corn, tall, sunflower, safflower, dehydrated castor oil, and the like. In the polymerization process for the preparation of the polymeric fat acids, the fatty acids with sufficient double bond functionality combine, for the most part, probably by a Diels-Alder mechanism, to provide a mixture of dibasic and higher polymeric acids. The acids with insufficient functionality to react remain as monomers and may be removed by distillation. The residue after distillation consists of the desired polymeric acids, and this mixture is used for the preparation of the polyamide resin. In place of this method of polymerization, any other method of polymerization may be employed, whether the resultant polymer possesses residual unsaturation or not. The term "polymeric fat acid" as used herein is intended to include the polymerized mixture of acids obtained, which mixture usually contains a predominant proportion of dimeric acids, a smaller quantity of trimeric and higher polymeric acids, and some residual monomer.

The reaction between the polyalkylene polyamine and the dibasic and polymeric fat acids usually is conducted at temperatures above room temperature. For practical rates of reaction between said polyamines, dibasic acids, and fat acids, the temperatures necessary are from about 60° C. to about 200° C. The time of reaction will depend on the temperatures utilized, and will ordinarily vary from about 1 to 2 hours. The resulting polyamide is thereafter reacted with epichlorohydrin at a temperature from about 30° C. to about 90° C. and preferably between 30° C. to 80° C. Time of the reaction will depend on the temperature and will vary from about 1 to 1½ hours.

The foregoing reaction is general in nature and the following specific examples are given as illustrative thereof.

EXAMPLE I

The polyamide-epichlorohydrin resin of the present invention was prepared from the following reactants.

| Reactant: | Grams |
| --- | --- |
| Empol 1022 dimer acid (molecular weight of approx. 600) | 30.0 |
| Stearic acid | 7.5 |
| Adipic acid | 29.2 |
| Diethylenetriamine | 28.2 |

From the above table it will be apparent that the Empol 1022 dimer acid (30 grams/600 molecular weight=0.05 mole) and adipic acid (29.2 grams/146.1 molecular weight=0.20 mole), are in the molar ratio of about 1 to 4.

The triamine was heated to 60° C. and the dimer acid was added slowly thereto resulting in an exothermic reaction and the temperature rose at 137° C. The adipic acid and then the stearic acid were added with the temperature being maintained between 190-200° C. The reaction mixture was then cooled to 170° C. and poured slowly into 100 grams of anhydrous isopropanol. The reaction container was rinsed with 20 grams of isopropanol, added to the main reaction mixture, and set aside to react with the epichlorohydrin. The total reaction time was approximately 95 minutes. Thereafter, the above combined reaction product was placed in a 1000 ml. flask and 100 grams of epichlorohydrin added thereto. This reaction mixture was heated with stirring to 60° C. After about one hour during which the reaction temperature did not exceed 80° C., the mixture was cooled to 50° C. and approximately 100 ml. of warm water was added to give the final product.

EXAMPLE II

A particularly satisfactory resin having good water holdout and sizing properties in addition to good wet strength was prepared by the method of Example I, except that the proportions of material were as follows.

| Reactant: | Grams |
| --- | --- |
| Empol 1022 dimer acid | 70.7 |
| Adipic acid | 63.8 |
| Diethylenetriamine | 59.3 |
| Stearic acid | 7.1 |
| Epichlorohydrin | 128.5 |

From the above table, it will be apparent that the Empol 1022 dimer acid (70.7 grams/600 molecular weight=0.118 mole)

and adipic acid (63.8 grams/146.1 molecular weight=0.436 mole)

are in the molar ratio of about 1 to 3.7.

Pursuant to Bulletin EM-948 issued by Emery Industries, Inc., Empol 1022 dimer acid is a polymerized fatty acid, essentially a $C_{36}$, dibasic acid resulting from dimerization of naturally-occurring $C_{18}$ unsaturated fatty acids. The molecular weight of Empol 1022 is approximately 600. The structure is estimated to be

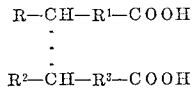

where the linkage ( . . . ) between the two molecules is indeterminate. The (a) R and $R^2$ groups and (b) $R^1$ and $R^3$ groups are probably straight-chain alkyl and alkylene groups, respectively, but not necesarily of the same chain length.

During the preparation of the above polyamide-epichlorohydrin resin, some foaming will occur during the formation of the polyamide such that a small amount of an anti-foaming agent may be incorporated in the reaction mass to minimize the same.

EXAMPLE III

Another thermosetting cationic resin of the present invention was prepared in a similar two stage reaction from the following materials.

| Batch materials: | Grams |
| --- | --- |
| Empol 1014 dimer acid | 165.0 |
| Stearic acid | 7.1 |
| Adipic acid | 40.9 |
| Diethylenetriamine | 59.3 |
| Epichlorohydrin | 116 |

Empol 1014 is a dimer acid sold by Emery Industries Inc. According to the Emery technical bulletin the properties are:

| | Empol 1014 |
| --- | --- |
| Neutralization equivalent | 288–294 |
| Acid value | 191–195 |
| Saponification value | 195–199 |
| Monobasic acids (by distillation to 270° C. at 1–3 mm. Hg. abs.) (percent max.) | 1.5 |
| Dimer acid (36 carbon atoms, 2 carboxyl groups, approximate molecular weight 565, approximate equivalent weight 283), percent | 95 |
| Trimer acid (54 carbon atoms, 3 carboxyl groups, approximate molecular weight 850, approximate equivalent weight 283), percent | 4 |
| Molecular weight (approximate) | 585 |

From the above tables, it will be apparent that the Empol 1014 dimer acid (165.0 grams/585 molecular weight=0.28 mole) and adipic acid (40.9 grams/146.1 molecular weight=0.28 mole) are in the molar ratio of about 1 to 1.

A two liter reaction flask equipped with a mechanical stirrer, and thermometer was set up for distillation in a heating mantle. The dimer acid was charged, heated and stirred while the diethylene triamine, stearic acid, and adipic acid were added slowly. A few drops of antifoam agent (SAG-47 General Electric) were added to minimize foaming.

The above materials were added over a period of about 30 minutes while the temperature was raised to about 150° C. After heating for an additional 15 minutes, the temperature had reached 160° C. and distillate began to appear in the receiving vessel. Eighteen ml. of distillate were collected over the next 60 minute period while the temperature was raised from 160° C. to 200° C.

At the end of this period, the flask was cooled to about 150° C. and 300 grams (384 ml.) of isopropanol were added to the 272 grams of reaction mass and a solution was effectuated. Fifty-seven grams of the alcoholic polyamide solution were removed for control purposes.

When the temperature of the remaining 515 grams of alcoholic polyamide solution was about 43° C., the epichlorohydrin addition was begun while the reaction mixture was stirred. The epichlorohydrin was added over a 20 minute period while the temperature rose from 43° C. to 63° C. from the exothermic reaction. This temperature was maintained by heating for about 60 minutes while the stirring was continued.

This reaction mass was then poured slowly into a hydrochloric acid solution of pH 5 (37 ml. conc. HCl in 3270 ml. distilled water) with stirring while the temperature of both liquids was about 40° C. A low viscosity solution resulted.

EXAMPLE IV

To further demonstrate the range of composition of the resins of the invention, the following batch was prepared.

| Batch material: | Grams |
| --- | --- |
| Empol 1014 dimer acid | 70.7 |
| Stearic acid | 7.1 |
| Adipic acid | 63.8 |
| Diethylenetriamine | 59.3 |
| Epichlorohydrin | 116 |

From the above table, it will be apparent that the Empol 1014 dimer acid (70.7 grams/585 molecular weight=0.12 mole) and adipic acid (63.8 grams/146.1 molecular weight=0.437 mole) are in the molar ratio of about 1 to 3.6. The same equipment described in Example III was used. The dimer acid, stearic acid, adipic acid and diethylenetriamine were added in the manner described in Example III. A few drops of antifoam agent (SAG-47 General Electric) was also added. The addition of the above materials was accomplished over a 20 minute period while the temperature was being raised to about 85° C. The temperature was then raised to about 157° C. over a 30 minute period at which time distillate began to collect in the receiver. The temperature was increased gradually to 200° C. over a 2 hour and 20 minute period at the end of which 19 ml. of distillate had been collected. There were about 201 grams of reaction mass in the flask.

The reaction mass was cooled to about 150° C. and 430 grams of isopropanol were added to effectuate solution. Fifty-eight grams of the polyamide-isopropanol solution were removed for control purposes.

To the above polyamide-isopropanol solution, epichlorohydrin was added in the manner of Example III. When the addition was complete, the reaction was allowed to proceed at 50-60° C. for about 1 hour.

At the end of this reaction period, the reaction mass was poured into a warm (53° C.) solution of 45 ml. of conc. HCl and 2375 ml. of distilled water with stirring. A clear yellow solution of pH 4 resulted.

EXAMPLE V

Another resin composition of the present invention was prepared using the same equipment as in Example III from the following materials.

| Batch material: | Grams |
| --- | --- |
| Empol 1014 dimer acid | 18.7 |
| Stearic acid | 7.1 |
| Adipic acid | 30.0 |
| Tetraethylenepentamine | 95.0 |
| Epichlorohydrin | 124 |

From the above table, it will be apparent that the Empol 1014 dimer acid (18.7 grams/585 molecular weight=0.032 mole) and adipic acid (30.0 grams/146.1 molecular weight=0.206 mole) are in the molar ratio of about 1 to 6.5.

The dimer acid, stearic acid, adipic acid and tetraethylenepentamine were added with heating and stirring according to the method of Example III. A few drops of antifoam agent (SAG-47 General Electric) were also added. The temperature was raised to 170° C. over a period of 30 minutes after the materials were added. The heating was continued for the next 70 minute period while the temperature increased from 170° C. to 200° C., while 6 ml. of distillate were collected. The reaction mass was cooled to 150° C. and 300 grams of isopropanol (384 ml.) were added to effectuate solution of the polyamide. Forty-four grams of this polyamide-isopropanol solution were withdrawn for control purposes.

The condenser was set for reflux and 124 grams of epichlorohydrin were added slowly. The ensuing reaction was allowed to proceed at 70-85° C. for about an hour. The reaction mass became quite viscous. The reaction mass was then poured into a warm (40° C.) hydrochloric acid solution (39 ml. conc. HCl in 3000 ml. distilled water) with stirring. It was not possible to transfer the entire contents of the reaction flask into acid solution because of the extreme viscosity. That portion of the resin that was transferable resulted in a clear yellow solution upon admixing with the hydrochloric acid.

In each of the above examples, the use of a small amount of stearic acid results in the formation of an improved resinous product. Specifically, it has been noted that the stearic acid gives water stability to the resin. Besides stearic acid, any saturated, aliphatic monobasic acid that is insoluble in water and having at least twelve carbon atoms can be employed, such as myristic, behenic, cerotic, and palmitic acids, by way of example.

In the examples, a satisfactory amount of this monobasic acid has been found to lie in the range of about 0.05 to 0.13 mole of such aliphatic, monobasic acid per mole of dibasic acid.

The process for the preparation of paper containing the polyamide epichlorohydrin resins of the present invention follows conventional procedures well known in the art. For example, the resin is added to the pulp, after which the pulp is well agitated and the sheet then formed and dried in the usual manner thereby curing the resin to its polymerized and water-insoluble condition whereby wet strength and excellent sizing are imparted to the paper. In general, from 0.25 to 4.0% of the resin based on the dry weight of the pulp is preferred although larger amounts of the resin can be employed.

A comparison of papers incorporating the polyamide-epichlorohydrin resin of the present invention and a polyamide-epichlorohydrin resin wherein the polyamide is derived from a polyamine and a dibasic carboxylic acid shows that superior results are obtained with the resin of the present invention as indicated by Table I.

TABLE I.—COMPARISON OF KYMENE 557 [1] AND VARIOUS POLYAMIDE EPICHLOROHYDRIN RESINS OF THE PRESENT INVENTION WITH RESPECT TO PERFORMANCE AS A WET STRENGTH AND SIZING ADDITIVE TO PULP pH 7

| Pulp Sample | Resin | Percent Resin on Pulp | Percent Resin Retained | Resin Efficiency [2] | Sizing Properties | | Wet Strength Properties | | |
|---|---|---|---|---|---|---|---|---|---|
| | | | | | C.W.P., min. | F.I.P., sec. | Tensile Strength | | |
| | | | | | | | Dry | Wet | Percent W/D |
| 1 | Kymene 557 | 2.0 | | | 20 | 10 | | | |
| 2 | do | 4.0 | 2.80 | 13.7 | 20 | 10 | 38.6 | 14.7 | 39.3 |
| 3 | Resin produced in Example I | 2.0 | 1.22 | 30.6 | 60+ | 600+ | 27.8 | 10.4 | 37.4 |
| 4 | do | 4.0 | 2.80 | 14.8 | 60+ | 600+ | 29.7 | 12.3 | 41.4 |
| 5 | Blank | 0 | 0 | | 8 | 8 | 30.3 | 1.8 | 5.9 |
| 6 | Kymene 557 | 0.5 | 0.37 | 63.2 | | | 54.7 | 12.8 | 23.4 |
| 7 | do | 1.0 | 1.00 | 33.3 | | | 62.4 | 20.8 | 33.3 |
| 8 | do | 2.0 | 1.96 | 19.6 | 3 sec. | <1 | 51.4 | 19.8 | 38.5 |
| 9 | do | 4.0 | 2.80 | 14.7 | 2 sec. | <1 | 56.8 | 23.4 | 41.2 |
| 10 | Resin produced in Example I | 0.5 | 0.23 | 115.0 | | | 63.4 | 16.7 | 26.4 |
| 11 | do | 1.0 | 0.51 | 69.3 | | | 55.7 | 19.7 | 35.4 |
| 12 | do | 2.0 | 1.26 | 29.4 | 60+ | 600+ | 48.5 | 17.8 | 37.0 |
| 13 | do | 4.0 | 1.80 | 22.8 | 60+ | 600+ | 49.1 | 20.2 | 41.2 |
| 14 | Blank | 0 | 0 | | 2 | 2 | 47.1 | 2.0 | 4.3 |
| 15 | Resin produced in Example III | 0.5 | 73 | 42 | 600+ | 38 | 32.0 | 9.8 | 30.6 |
| 16 | do | 1.5 | 80 | 48 | 600+ | 44 | 35.6 | 13.8 | 38.7 |
| 17 | do | 14.5 | 53 | 80 | 600+ | 50 | 38.2 | 16.2 | 42.5 |
| 18 | Resin produced in Example IV | 0.5 | 88 | 30 | 600+ | 4 | 35.2 | 9.2 | 26.1 |
| 19 | do | 1.5 | 77 | 44 | 600+ | 22 | 37.8 | 12.9 | 34.2 |
| 20 | do | 4.5 | 65 | 61 | 600+ | 48 | 27.4 | 10.8 | 39.4 |
| 21 | Resin produced in Example V | 0.5 | 55 | 45 | 600+ | 5 | 38.8 | 9.5 | 24.5 |
| 22 | do | 1.5 | 66 | 45 | 600+ | 4 | 43.5 | 12.8 | 29.4 |
| 23 | do | 4.5 | 59 | 63 | 600+ | 36 | 48.2 | 17.9 | 37.2 |
| 24 | Kymene 557 | 0.5 | 59 | 41 | 0.5 | 0.1 | 39.3 | 9.5 | 24.2 |
| 25 | do | 1.5 | 65 | 56 | 0.5 | 0.1 | 44.9 | 15.8 | 36.2 |
| 26 | do | 4.5 | 55 | 67 | 0.5 | 0 | 48.6 | 17.9 | 36.9 |
| 27 | Pulp control; no treatment | | | | 0.5 | | 26.5 | 2.1 | 7.9 |

[1] Resin made from adipic acid and tetraethylenepentamine further reacted with epichlorohydrin.
[2] Resin efficiency=percent wet/dry tensile strength/percent retained resin.

TABLE II.—COMPARISON OF VERSAMID 100 [1] (C) AND POLYAMIDE EPICHLOROHYDRIN RESIN PREPARED IN EXAMPLE 1

| Pulp Sample | Resin | Percent Resin on Pulp | Cure Time, min. | C.W.P., min. | F.I.P., sec. | Tensile Strength | | |
|---|---|---|---|---|---|---|---|---|
| | | | | | | Dry | Wet | Percent W/D |
| 28 | C | 3.0 | 5 | 7.3 | 21.5 | 16.6 | 3.7 | 22.3 |
| 29 | C | 5.0 | 5 | 6.3 | 29 | 16.2 | 3.6 | 22.2 |
| 30 | Ex. I | 2.0 | | 60+ | 600+ | 27.8 | 10.4 | 37.4 |
| 31 | Ex. I | 4.0 | | 60+ | 600+ | 29.7 | 12.3 | 41.4 |
| 32 | Blank | 0 | 5 | 1 | 4 | 29.9 | 0.6 | 2.0 |

[1] Resin made from carboxylic fatty acid and tetraethylenepentamine.

From the column heading identified as "resin efficiency" in Table I, it will be apparent that the novel resins of this invention are more economical since lesser amounts of the resin are required to produce the superior results obtained (see "percent resin retained" column of Table I).

In the above tables, C.W.P. has reference to a cold water penetration (C.W.P.) test which consists of placing a 4 inch square of paper on the surface of distilled water at 73° F. in such a manner that water does not run over the upper surface of the paper. The time required for water to penetrate from the lower surface to the upper surface of the paper is the measure of its absorbency or water repellency. The time is the visual observation of the wetting or darkening of 98% of the upper surface.

Similarly, F.I.P. has reference to a feather ink penetration (F.I.P.) which is like the C.W.P. test except that a 1½" square of sample is placed on the surface of an ink solution. A visual observation is made of the time required to wet 50% of the upper surface of the paper sample, with the ink at 73° F. The formula for the feather ink is as follows:

9 grams soluble blue 2B extra, National Aniline
10.2 cc. conc. HCl
Dilute with distilled water, 73° F. to 1425 ml., then add 476 ml. of 85% lactic acid.

The process and resin of the present invention are also effective in imparting water holdout properties to wool fabrics as evidenced by the following:

Sample swatches of wool were dipped into a 1% solution of the resin in water, using a tub-sizing process. When saturated, the swatches were immediately removed from the solution and squeezed to remove excess. The swatches were then dried on a steam-heated platen, whereupon the resin gelled and cured.

Water resistance was then demonstrated by placing a drop of water on the sample or by placing swatches on the surface of water in a pan. Untreated control swatches absorbed water instantaneously. The resin treated samples absorbed water very slowly. In the drop test, a drop of water was placed on the cloth surface and absorption time was measured. The drop on treated wool, for example, showed a very high contact angle, indicative of water repellency. The swatches were next washed in hot soapy water for 20 minutes, rinsed, and dried. Tests again indicated the same degree of water repellency, showing that the resin was not removed by such washing as evidenced by the following table.

TABLE III.—WATER DROP TEST ON WOOL SWATCH

| | Absorbency After Washing | Absorbency After Washing |
|---|---|---|
| Control Swatch | 45–57 sec. | 29–33 sec. |
| Resin Treated Swatch | 10 min. | 9 min. |

In general, from .25 to 4.0% of the resin based on the dry weight of the wool is preferred although larger amounts of the resin can be employed.

It should be noted that no novelty is claimed for a polyamide prepared from an alkylene diamine and a fat acid which is described fully in U.S. Patent No. 2,767,089 to Renfrew et al. Moreover, no novelty is alleged for polyamide-epichlorohydrin resins wherein the polyamide is prepared from an alkylene diamine and selected aliphatic dicarboxylic acids which is described fully in U.S. Patent No. 2,962,154 to Keim. However, it is maintained that applicant's use of a mixture of these acids with an alkylene diamine to form a polyamide which is subsequently reacted with epichlorohydrin is inventive since it results in the formation of polyamide-epichlorohydrin resins having properties which excel either of the resins used individually as disclosed in U.S. patents referred to above. The results obtained by the applicant are not only unexpected but are indicative of a synergistic effect being produced. As a result, lesser amounts of applicant's resin can be employed thereby effecting economies in coating materials for the purposes of improving their wet strength and sizing (or waterproofing) properties in the case of cellulosic materials such as cotton fabrics and paper, and water holdout properties in the case of wool fabrics.

Various modifications of the invention disclosed herein will be evident to those skilled in the art. Thus, the novel resins of the present invention can be applied to preformed and partially or completely dried paper by immersion or spraying instead of being added to the paper pulp. As a result, it will be seen that the present invention permits the preparation of paper characterized by having excellent strength and sizing properties by internal addition or by surface application.

While preferred embodiments of the invention have been exemplified and described herein, the invention is not to be construed as limited thereby.

I claim:

1. A thermosetting, cationic resin which will impart wet strength and water holdout properties when applied to cellulosic materials comprising the reaction product of a mixture of epichlorohydrin and a polyamide, said polyamide comprising the reaction product of a polyalkylene polyamine, a polymeric fat acid, and a saturated aliphatic dibasic carboxylic acid containing from about 3 to about 10 carbon atoms, the molar ratio of said polymeric fat acid to said saturated aliphatic dibasic carboxylic acid ranging from about 1:0.5 to 1:8.

2. The resin of claim 1 wherein the saturated aliphatic dibasic carboxylic acid contains from about 4 to about 8 carbon atoms.

3. The resin claim 2, wherein said reaction to form said polyamide is carried out between about 60° and about 200° C.

4. The resin of claim 3, wherein said reaction to form said polyamide is carried out in the presence of a saturated aliphatic monobasic acid having at least 12 carbon atoms.

5. The resin of claim 4, wherein said molar ratio ranges from about 1:1 to about 1:6.5

References Cited

UNITED STATES PATENTS

| | | | |
|---|---|---|---|
| 3,259,600 | 7/1966 | Coscia et al. | 260—78 X |
| 3,248,280 | 4/1966 | Nyland | 162—164 |
| 3,140,566 | 7/1964 | Wagner | 260—18 X |
| 2,926,154 | 11/1960 | Keim | 162—164 |
| 2,882,185 | 4/1959 | Valko et al. | 260—18 X |
| 2,839,219 | 6/1958 | Groves et al. | 260—18 X |
| 2,811,495 | 10/1957 | Wittcoff et al. | 260—18 |
| 2,705,223 | 3/1955 | Renfrew | 260—18 |
| 2,653,880 | 9/1953 | Hendricks et al. | 260—18 X |

DONALD E. CZAJA, *Primary Examiner.*

C. WARREN IVY, *Assistant Examiner.*

U.S. Cl. X.R.

117—139.5; 162—164, 168; 117—155; 260—78, 29.2